United States Patent Office 3,740,366
Patented June 19, 1973

3,740,366
PRESSURE SENSITIVE ADHESIVE CONTAINING CARBOXYLIC ACID GROUPS AND POLYVALENT METAL
Frank Thomas Sanderson, Huntingdon Valley, and Richard E. Zdanowski, Fort Washington, Pa., assignors to Rohm & Haas Company, Philadelphia, Pa.
Continuation-in-part of application Ser. No. 80,132, Oct. 12, 1970, which is a continuation-in-part of application Ser. No. 19,571, Mar. 16, 1970, which in turn is a continuation-in-part of application Ser. No. 819,598, Apr. 28, 1969, all now abandoned. This application Jan. 22, 1971, Ser. No. 108,819
Int. Cl. C08f 37/14
U.S. Cl. 260—29.6 M                    9 Claims

ABSTRACT OF THE DISCLOSURE

The pressure sensitive adhesive of this invention has improved shear resistance while still having good tackiness, it is prepared by emulsion or solution polymerization, or by other methods, and has carboxylic acid groups therein, at least some of which are bound or crosslinked by a polyvalent metal, by ionic, polar, and/or coordination bonds. There are various possible theories or hypotheses as to what is involved in "crosslinking," the invention not being limited thereto. The invention includes adhesive tapes and other articles and their manufacture, in addition to the adhesive compositions.

---

This application is a continuation-in-part of Ser. No. 80,132, filed Oct. 12, 1970 now abandoned, which is a continuation-in-part of Ser. No. 19,571, filed Mar. 16, 1970, now abandoned, which is a continuation-in-part of Ser. No. 819,598, filed Apr. 28, 1969, now abandoned.

This invention is concerned with improvements in pressure sensitive adhesives prepared from addition polymers, particularly from acrylic monomers by emulsion polymerization or equivalent methods, and articles made therewith.

Pressure sensitive adhesives have in the past been prepared from aqueous dispersions of polymers, including those which have free carboxylic acid groups or monovalent salts thereof. Examples of the prior art are the Young and Toy patents numbered 2,976,203 and 2,976,204. It is also known to chemically crosslink polymers in adhesives, the polymers therein having reactive groups such as carboxyl groups, which can be chemically reacted with crosslinking compounds, such as epoxies or bonded by other mechanisms. For example, it has heretofore been suggested that calcium oxide or zinc hydroxide added to a copolymer of ethyl hexyl acrylate, ethyl acrylate, and the half-amide of an alkyl amine and maleic anhydride provides crosslinking. The quantity of half-amide in the polymer ranged from 5% to 70%.

One of the problems in obtaining useful pressure sensitive adhesives is the relationship of tack to shear resistance. Often if an adhesive is modified to increase tackiness, its resistance to shearing is lowered, and commonly an increase in shear resistance is accompanied by a reduction in tackiness.

It has now been found that improved shear resistance is obtained in a pressure sensitive adhesive prepared from a polymer containing free carboxylic groups derived from up to 4.5% of the total monomers of an $\alpha,\beta$-ethylenically unsaturated carboxylic acid, by including in an aqueous dispersion or solution of the polymer a compatible polyvalent metal compound. If in an aqueous media, the compound dissociates to provide polyvalent metal ions or polyvalent metal-containing ions, thereby providing ionic crosslinking of carboxylate groups upon removal of the aqueous media, according to one workable hypothesis of the phenomena, to which hypothesis the invention is not limited however. It is also found, surprisingly, that no appreciable loss of tackiness occurs. A valuable and unexpected property of the adhesive of the invention is that it is resistant to removal by alkaline solutions, particularly when the carboxylic acid monomer is used at the lower levels.

Figure 1:
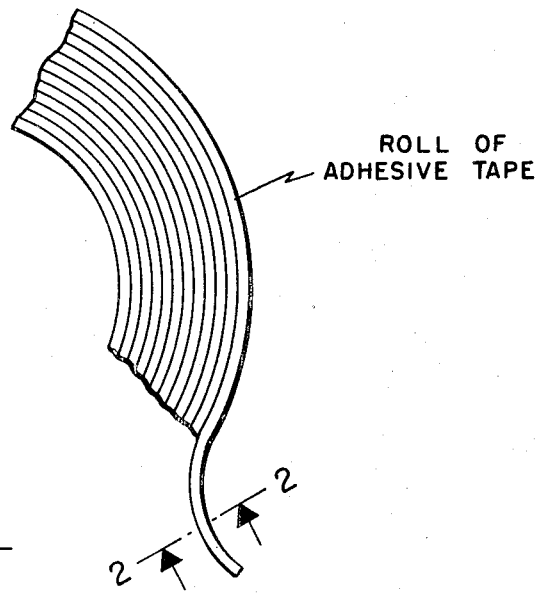
Figure 2:
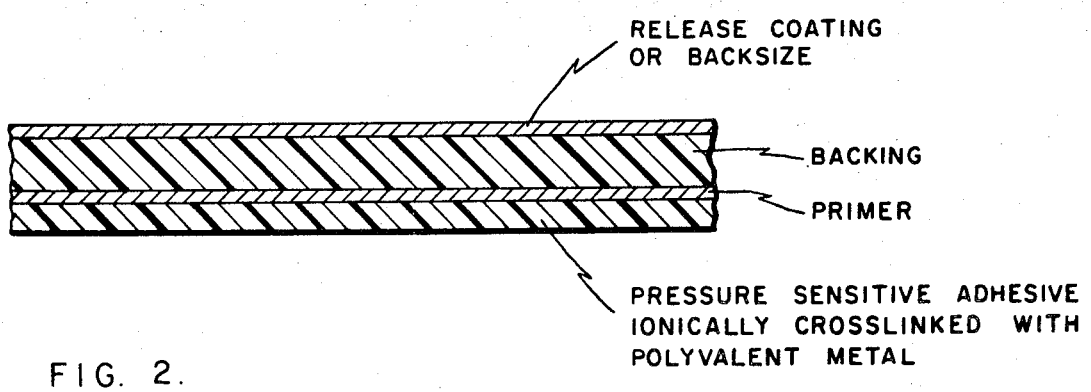

In the drawings, FIG. 1 represents a cut-away view of a roll of adhesive tape, FIG. 2 being a section on the line 2—2 of FIG. 1.

One of the monomers utilized in a substantial proportion to prepare a pressure sensitive adhesive is a tackifying or "soft" monomer which may be represented by the following formula:

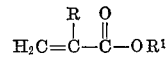

wherein R is H or alkyl having 1 to 4 carbon atoms and $R^1$ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals $R^1$, when alkyl, having from 2 to about 14 carbon atoms, preferably from 3 to 12 carbon atoms, when R is H or methyl. When R is alkyl and $R^1$ is alkyl, $R^1$ should have from about 6 to about 14 carbon atoms and when R is H and $R^1$ is alkyl, $R^1$ should have from about 2 to about 12 carbon atoms, in order to qualify as a tackifying monomer. As is apparent from the disclosure elsewhere herein, an important property of the polymer is the Tg thereof, and consequently the selection of monomers and proportions thereof depends upon their influence on the Tg. The Tg of the polymer must be below 0° C. (i.e., it must give a tacky coating) and is preferably below —15° C. "Tg" is a conventional criterion of polymer hardness and is described by Flory, "Principles of Polymer Chemistry," pp. 56 and 57 (1953), Cornell University Press. While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Homopolymer of: | Tg, ° C. |
|---|---|
| n-Octyl acrylate | —80 |
| n-Decyl methacrylate | —60 |
| 2-ethylhexyl acrylate | —70 |
| Octyl methacrylate | —20 |
| n-Tetradecyl methacrylate | —9 |
| Methyl acrylate | 9 |
| n-Tetradecyl acrylate | 20 |
| Methyl methacrylate | 105 |
| Acrylic acid | 106 |

These or other monomers are blended to give the desired Tg of the copolymer. For example, a large proportion (e.g., 90 percent by weight) of a combination of 3 parts of acrylic acid or methacrylic acid and 87 parts of methyl acrylate (all "hard" monomers) with a small proportion (e.g., 10 percent) of octylacrylate (a "soft" monomer) provides a copolymer having the desired Tg. Most of the esters of acrylic acid or methacrylic acid having a low Tg are well known in the pressure sensitive adhesive art as tackifying monomers.

In addition to the tackifying monomer, the other essential monomer is any copolymerizable ethylenically unsaturated monocarboxylic or polycarboxylic acid, examples being sorbic, cinnamic, vinyl furoic, $\alpha$-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. The acid monomer may contain more than one carboxylic acid group as has been suggested above by specific examples.

Other ethylenically unsaturated copolymerizable "hard" monomers having a Tg of above 0° C. are useful in combinations with the above mentioned tackifying monomers and acid monomers provided they do not adversely affect the desired properties of the adhesive (e.g., unduly raise the overall Tg) and do not seriously interfere with the crosslinking by the polyvalent metal. These may be represented by the formula:

$$H_2C=\underset{R}{C}-\underset{}{\overset{O}{C}}-OR^2$$

wherein R is as above. $R^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, N-methylolacrylamide and the like preferably present, if at all, in amounts of less than about 89.7 percent, preferably less than 29.5 percent, by weight of the total amount of monomers. Thus, polymers stated as consisting essentially of the unsaturated acid monomer and the acrylic acid ester include such additional monomers as do not change the basic characteristics of the adhesive material of the invention.

The proportions of the monomers fall within the following ranges:

| | Approximate parts by weight | |
|---|---|---|
| | Useful range | Preferred range |
| Tackifying monomer | 10–99.7 | 70–99.5 |
| Unsaturated carboxylic acid monomer | 0.3–4.5 | 0.5–3.5 |
| Other hard monomers | 0–89.7 | 0–29.5 |

The total of the monomers is 100 parts. These ranges, however, should not be construed as the only useful specifications because the most important criteria as far as polymer composition is concerned is the glass temperature (Tg) of the polymer and not the ratio of the individual monomers. The useful range of the polymer Tg is 0° C. or less, preferably —15° C. or less.

The emulsion copolymer, having a molecular weight of between about 70,000 and 2,000,000, and preferably between about 250,000 and 1,000,000 is made by the emulsion copolymerization of the several monomers in the proper proportions. Conventional emulsion polymerization techniques are described in United States Pats. 2,754,280 and 2,795,564. Thus, the monomers may be emulsified with an anionic, a cationic, or a nonionic dispersing agent, about 0.05 percent to 10 percent thereof ordinarily being used on the weight of the total monomers. The acid monomer is usually soluble in water so that the dispersing agent serves to emulsify the other two monomers. A polymerization initiator of the free radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1 percent to 10 percent each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine, or mixed ethanolamines, or any of the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful.

Although emulsion polymers are preferred, polymers prepared in organic solutions, e.g., in xylene, methyl "Cellosolve" and the like, by well known conventional means such as free radical initiation with benzoyl peroxide or the like are also useful. In such a case, an organosoluble polyvalent metal compound provides the means to achieve the crosslinking by coordination, polar attraction, or by a mechanism explained by some other nonlimiting theory or hypothesis. Among the polyvalent metal compounds discussed herein are a number of organosoluble materials, zinc octoate being an example. Solution polymers useful in the invention preferably have a molecular weight of between about 10,000 and 1,000,000.

Another hypothesis (the invention not being limited thereto) which may explain the function of the crosslinking or carboxyl-insolubilizing aspect of the metal, particularly in an organic solvent system, is that of cation exchange. This could function in the following way:

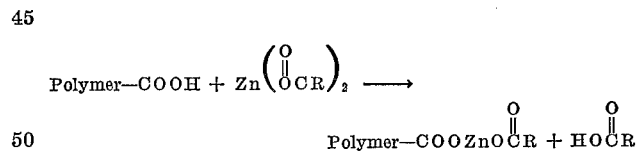

Furthermore, a pair of carboxyl groups in the same polymer molecule may be "crosslinked." Whatever the mechanism, it remains that the use of the polyvalent metal compounds in either an aqueous or a solvent system provides a method of getting a good balance of the properties of tackiness and shear resistance.

The polyvalent metal compound compatible with the aqueous or organic solvent system may be either a simple ionic compound or a metal complex or a metal chelate, which is at least partially ionizable or soluble in the system. The polyvalent metals are selected from Groups I–B, II–A, II–B, III–B, IV–B, V–B, VI–B, VII–B, VIII, III–A, IV–A, V–A, and VI–A of the periodic table. Preferably, the polyvalent metal is selected from the Groups II–B and IV–B. Suitable polyvalent metals include: copper, gallium, tin, cerium, titanium, vanadium, chromium, molybdenum, manganese, iron, cobalt, nickel, beryllium, cadmium, calcium, magnesium, zinc, zirconium, barium, strontium, aluminum, bismuth, antimony, lead, cobalt, or any other polyvalent metal which can be added to the composition by means of an oxide, hydroxide, or basic, acidic, or neutral salt or other compound or complex which has appreciable solubility in water or other liquid, such as at least about 1 percent by weight therein. Zinc, cadmium, and zirconium compounds are preferred. The selection of polyvalent metal and the anion are governed by the solubility of the resultant metal complex or compound in the liquid medium used.

Examples of the organic and inorganic metal salts and compounds include carboxylic acid salts and chelates, such as zinc acetate, zinc benzoate, tin tartrate, lead acetate, chromium acetate, manganese tartrate, manganese benzoate, magnesium citrate, ferrous acetate, iron lactate, nickel acetate, cobalt acetate, cobalt benzoate, cobalt propionate, copper acetate, chelates or complexes which involve coordination bonding and may be partially ionizable such as the zinc chelate of alanine or glycine, calcium chloride, aluminum diacetate, magnesium acetate, calcium carbonate, zirconium acetate, calcium acetate, calcium hydroxide, barium acetate, magnesium chloride, manganese sulfate, ammonium complexes such as of zinc benzoate, zinc carbonate, or zinc sulfate, and the like. Any salt or chelate having both ionic and coordination bonding in which the metal is sufficiently available or dissociable to bind the carboxyl groups of the polymer is useful.

The ammonia and amine complexes (and especially those coordinated with $NH_3$) of these metals are particularly useful. Amines capable of so complexing include morpholine, monoethanol amine, diethylaminoethanol, and ethylenediamine. Polyvalent metal complexes (salts) of organic acids that are capable of solubilization in an alkaline pH range may also be employed. Such anions as acetate, glutamate, formate, carbonate, salicylate, glycollate, octoate, benzoate, gluconate, oxalate and lactate are satisfactory. Polyvalent metal chelates wherein the ligand is a bidentate amino acid such as glycine or alanine are particularly preferred. The polyvalent metal compound must be such that the metal is available to serve its cross-linking function, i.e., it is dissociable to some extent to form polyvalent metal-containing ions, or it is attracted to the carboxyl groups by an equivalent mechanism. It is not intended that the invention be limited by these or other theories or hypotheses of the mechanism performed by the cooperation between the metal compound and the carboxyl groups of the polymer. "Crosslinking" as used herein is intended to cover any of the possible phenomena or mechanisms by which the polyvalent metal modifies the adhesive of the invention.

Preferred polyvalent metal compounds, complexes and chelates include zinc acetate, cadmium acetate, zinc glycinate, cadmium glycinate, zirconium carbonate, zinc carbonate, cadmium carbonate, zinc benzoate, zinc salicylate, zinc glycollate and cadmium glycollate. Although the polyvalent metal compound may be added to the adhesive composition in dry form such as a powder, it is preferred to first solubilize the polyvalent metal compound using a fugitive ligand such as ammonia or a volatile amine. For purposes of this invention a ligand is considered fugitive if at least a portion of said ligand tends to volatilize under the film forming conditions utilized. Since the ammonia may complex with the polyvalent metal compound, a compound such as zinc glycinate, when solubilized in dilute aqueous ammonia solution, may be named zinc ammine glycinate or zinc ammonium glycinate.

A group of polyvalent metal complexes employed in adhesive formulations of this invention contain a polyvalent metal moiety, an organic bidentate amino acid ligand moiety and generally, if the chelate is added to the formulation in solubilized form, an alkaline moiety. The polyvalent metal ions may be those named above such as beryllium, cadmium, copper, calcium, magnesium, zinc, zirconium, barium, strontium, aluminum, bismuth, antimony, lead, cobalt, iron, nickel, or any other polyvalent metal which can be added to the composition by means of an oxide, hydroxide, or basic, acidic, or neutral salt chelate, or complex which has appreciable solubility in water, such as at least about 1 percent by weight therein.

The alkaline moiety may be provided by ammonia or an amine. The amino acid bidentate ligand is preferably an aliphatic amino acid, but may also be a heterocyclic amino acid.

The amino acid bidentate ligands may be represented by the formula:

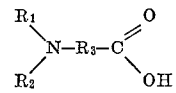

wherein $R_1$ and $R_2$ are independently selected from hydrogen, alkyl, phenyl and benzyl, $R_3$ represents a straight chain or branched chain alkylene, alkylidene or aralkylidene radical having 1 to 12 carbon atoms, preferably 1 to 6 carbon atoms, with the proviso that at least 1, but less than 4 carbon atoms, are in a straight chain joining the nitrogen atom and the carbonyl carbon atom, and $R_1$ and $R_3$ may form a 5 or 6 membered heterocyclic ring with the nitrogen atom to which they are joined with the proviso that $R_2$ is hydrogen.

Although $R_1$ and $R_2$ are preferably hydrogen, suitable $R_1$ and $R_2$ alkyl radicals contain 1 to 6 carbon atoms such as methyl, ethyl, propyl, isopropyl and butyl. $R_3$ is preferably methylene, but may be ethylene, propylene, ethylidene, n-propylidene, isopropylidene, butylidene and phenylethylidene.

Representative bidentate amino acid ligands include glycine (aminoacetic acid), alanine ($\alpha$-aminopropionic acid), $\beta$-alanine ($\beta$-aminopropionic acid), valine ($\alpha$-isopropylaminoacetic acid), norvaline ($\alpha$-n-propylaminoacetic acid), $\alpha$-aminobutyric acid, leucine (2-amino-4-methyl pentanoic acid), norleucine (2-aminohexanoic acid), N-methylaminoacetic acid, N-ethylaminoacetic acid, dimethylaminoacetic acid, diethylaminoacetic acid, N-n-propylaminoacetic acid, N-iso-propylaminoacetic acid, N-butylaminoacetic acid, phenylalanine, N-phenylaminoacetic acid, N-benzylaminoacetic acid, proline, nicotinic acid and tetrahydronicotinic acid.

Preferred polyvalent metal complexes include cadmium glycinate, nickel glycinate, zinc glycinate, zirconium glycinate, cobalt alaninate, copper alaninate, zinc alaninate, copper $\beta$-alaninate, zinc $\beta$-alaninate, nickel norvalinate, zinc valinate and copper dimethylaminoacetate.

The polyvalent metal complex or coordinate compounds are initially readily soluble in the aqueous or organic medium of the pressure sensitive adhesive composition, especially at a pH of 6.5 to 10.5 in an aqueous system, and have the advantage of drying to form an adhesive which is essentially insoluble in water. The polyvalent metal complex may also be added to the water-insoluble emulsion copolymer in solubilized form. This is accomplished by solubilizing the metal complex in an alkaline solution such as dilute aqueous ammonia. Since the ammonia may complex with the polyvalent metal coordinate compound, a compound such as cadmium glycinate, when solubilized in an aqueous ammonia solution, may be named cadmium ammonium glycinate. Other polyvalent metal complexes described in this invention may be similarly named.

The polyvalent metal complexes used with the latices must be stable in an alkaline solution; however, a complex that is too stable is undesirable since dissociation of the metal ions would be retarded during film formation of the coating.

The polyvalent metal compound used is employed in an amount so that the ratio of polyvalent metal to the carboxyl groups of the $\alpha$-$\beta$-ethylenically unsaturated acid or other polymerizable carboxylic acid of the addition polymer varies from about 0.01 to 2.0, and preferably from about 0.05 to 1.5. This is expressed on an equivalency basis as the ratio of metal, such as $Zn^{++}$, to —COOH or —COONH$_4$ groups, a ratio of 0.5 being stoichiometric. When the polymer is a dispersion or emulsion and the metal is calcium and/or magnesium, it may even be supplied in whole or in part by the use of hard water, contrary to the usual practice of making emulsion polymers and formulating them with deionized or distilled water. It is preferred at the higher levels of carboxylic acid content to use proportionately less polyvalent metal; the proportions are chosen so that the adhesive remains tacky but yet has good cohesive strength. In some cases excess metal compound has no deleterious effect.

The preferred aqueous dispersion when fially formullated as an adhesive composition should have a pH of 2.0 to 10.0 or more. More advantageously, its pH is from 6.5 to about 9.5. Suitable alkaline or buffering agents such as borax, sodium hydroxide, ammonia, or amines such as diethylamine, triethylamine, morpholine or triethanolamine may be introduced to adjust the pH to the desired value. At least a portion of the alkaline material must be such that it is volatilized upon curing the adhesive coating so that the polyvalent metal ions may perform their ionic crosslinking or equivalent function to link or bind carboxyl groups.

Conventional additives for pressure sensitive adhesives are also useful, examples including fillers or pigments, tackifier resins such as wood rosin, polyesters and the like, plasticizers such as the alkyl esters of adipic or phthalic acids, antioxidants, solvents such as alkanols having 1 to 12 carbon atoms, an example being isopropanol, foam suppressors and so forth. Many types of fillers or pigments may be employed. One of the best is rutile titanium dioxide. Others such as anastase titanium dioxide, lithopone, magnesium silicate, clay, wollastonite, zinc oxide, calcium carbonate, clays including kaolin and bentonite, silica, walnut shell, and so on, are useful. To some extent fibrous fillers such as cellulosic fibers or nylon staple may be employed. These additives are incorporated in the aqueous dispersion, nonaqueous dispersion or solution prior to coating the substrate therewith.

Any backing or substrate is useful, including rigid, flexible, non-extensible or stretchable materials including textile fabric, plastic film, nonwoven fiber sheets including waterlaid and air-laid products, metal sheets or foil, rubber or synthetic rubber, decorative sheets, plywood edging for plywood sheets, decals, and so forth. If in a roll, the back of the tape is usually coated with a release, backsize, or adhesive coating. Two sided adhesive articles are also useful. If not coiled into a roll, strippable paper or other protective means is provided. Commonly the face of the backing to which the pressure sensitive adhesive is applied is sized to improve the adhesion of the backing and the adhesive.

The adhesive of the present invention has been found to provide exceptionally good bonds with numerous substrates, including wood, paper, Formica brand decorative sheets, other plastic materials such as methyl methacrylate polymer, polyvinyl chloride, saran, polyethylene glycol terephthalate, nylon, phenolformaldehyde resins, urea-formaldehyde resins, and other thermoset materials such as melamine-formaldehyde resins; rayon, cotton, silk, wool, fibers of the polymeric materials mentioned above, leather, linoleum, asphalt tile, vinyl tile, ceramic tile, various silicates such as glass, mineral wool, asbestos, concrete, asbestos cement, plaster, metals such as aluminum, steel, iron, copper, zinc, chromium, nickel, as well as painted or enamelled surfaces, such as painted automobile bodies, woodwork, walls, ceilings, or floors.

Pre-cemented articles such as tapes, wallpapers, or tiles for decorating walls, floors, or ceilings may be produced in which the member to be ultimately applied to a surface to be decorated, such as a tape, wallpaper, or tile is provided on its back surface with a layer of the composition of the present invention and a protective backing is applied over the adhesive layer and is adapted to be stripped therefrom at the time the member is to be applied to the surface it is ultimately intended for. The protective layer may be a thin film of polyethylene or other material which can be stripped more or less readily from the adhesive layer. Besides tape, wallpaper, and tile, this technique may be used in connection with plastic films, wood veneer layers, or thin sheets of resin or plastic material such as sheets of Formica plastic or vinyl resin; and such films or sheets may be of any size adapted to be cut to ultimate size in the finishing of tables, counters, desks, or other furniture.

The adhesive composition may be colored or substantially colorless. Besides depending on the color of fillers, suitable colored pigments may be added in place of, or in addition to, the fillers. Also, if desired, direct dyes may be introduced to provide a desired color.

The permanently pressure sensitive adhesive is applied to the substrate or backing in various ways. One method is to apply an aqueous dispersion of the polymer to the base, particularly if an emulsion polymerized polymer is used. Any conventional coating method is useful.

In the following examples, which are illustrative of the invention, the parts and percentages are by weight unless otherwise noted.

While the polymer of the invention is preferably an aqueous dispersion or an organic solvent solution prepared in those mediums, it may also be used and/or prepared as a non-aqueous dispersion, a bulk polymerizate, an organic solvent solution of the polymer emulsified in water, and the like.

EXAMPLE 1

A glass bottle is charged with 100 grams of distilled water and a Teflon-covered magnetic stirrer bar. The container is placed on a magnetic stirring plate, and stirring speed adjusted to give a vortex reaching nearly to the bottom of the liquid. Zinc oxide (22 grams) is sifted into the water and stirred until a well-mixed slurry is obtained. At this point, 40 ml. of 28% ammonium hydroxide are added, followed by 42 grams of glycine, and stirring continued until a clear solution is obtained.

A second container is charged with 100 grams of an aqueous dispersion containing 55 weight percent of a tacky acrylic emulsion copolymer prepared in a conventional manner of a 98/2 weight ratio mixture of butyl acrylate and methacrylic acid. The emulsion is stirred using a magnetic stirrer assembly, and zinc ammonium glycinate solution, prepared as described above, is added in an amount to give about 0.25 equivalent of zinc per carboxyl. After mixing for several minutes, an aqueous solution of 7% ammonium hydroxide is added to the emulsion until the pH is raised to 9.5 as indicated by a Leeds and Northrup Model 7400–A–2 pH meter.

A film of the resultant emulsion is coated onto a polyethylene terephthalate sheet, using an adjustable Gardner knife set to an 8 mil gaps. After standing 2 hours at 25° C., the film is baked 15 minutes at 120° C. to drive off ammonia and accomplish the ionic crosslinking. Following a 48 hour conditioning at 25° C. and 50% relative humidity, the coated sheet is cut into 1″ x 8″ adhesive tapes. Shear resistance is measured using Pressure Sensitive Tape Council Method No. 7, which determines how long a ½ inch by 1 inch section of adhesive tape will support a 1,000 gram weight under standard conditions. Tack is determined by a 5 member test panel using qualitative touch or thumb comparisons. Results are shown in Table I.

EXAMPLE 2

An acrylic emulsion copolymer based on 98 weight percent butyl acrylate and 2 weight percent methacrylic acid is treated with half the amount of zinc glycinate as the product described in Example 1, and pH is raised to 9.5. Mixing techniques are identical to those described above. Test samples are prepared and evaluated using the same methods as those used in studying the product of Example 1. Data are shown on Table I.

TABLE I

| Sample | Equiv. zinc per —COOH | Shear resistance, hours | Tack |
|---|---|---|---|
| Product from example: | | | |
| 1 | 0.25 | 7 | Excellent. |
| 2 | 0.125 | 6 | Do. |
| Unmodified 98 BA/2 MAA copolymer | None | 0.9 | Do. |

NOTE.—BA=butyl acrylate; MAA=methacrylic acid.

EXAMPLE 3

An adhesive prepared as in Example 1 but containing an emulsion polymer prepared from 80 parts isobutyl acrylate, 15.5 parts methyl methacrylate and 4.5 parts acrylic acid, and zirconium acetate in an amount to give a $Zr^{++}$ to —COOH or —COONH$_4$ ratio on an equivalents basis of .1, is applied to polyvinyl chloride film and cured as in Example 1, with similar results.

EXAMPLE 4

Repeating Examples 1 to 3 but using zinc alaninate and zirconium alaninate as the metal compound gives similar results. Any of the soluble or solubilized metal compounds disclosed above are also useful.

The following examples illustrate thickened adhesives useful for applying ornamental bodies to substrates such as automobile bodies.

EXAMPLE 5

Charge 100 gm. of the adhesive emulsion from Example 1 to a stirred reactor. Stir slowly while adding 1.1 gm. of Gantrez M-155 [1]. Allow to stir for 15 minutes before adding 1.0 gm. of ethylene glycol and continue stirring slowly. Finally add 3.3 gms. of Cab-O-Sil M-5 [2] and continue to stir until a smooth, creamy mixture is obtained.

EXAMPLE 6

Charge 100 gm. of the adhesive from Example 1, 1.11 gm. Gantrez M-155 to the reactor as in Example 5 above. While stirring slowly, add 1.0 gm. of a polyacrylic acid thickener. Continue to stir while adding 3.3 gm. Cab-O-Sil M-5 and stir until a smooth, creamy mixture is obtained. Add 2 gm. of ammonium hydroxide and stir for about 5 additional minutes.

Films of the finished mastics are cast on polyethylene terephthalate film by use of a Gardner knife set to a 30 mil gap. After several hours of air drying, each sample is baked in an air circulating oven at 190° F. for 15 minutes. Following storage at 78° F. and 50% relative humidity for 36–48 hours, the films are cut into 1 x 8" strips for testing. Each sample is applied to a painted steel panel and a 4.5 lb. roller is slowly passed over the laminate twice to insure proper bond formation. After 20 minutes of laminate aging, adhesion of each sample is measured by peeling the samples at a 180° angle at 10 inches per minute using an Instron tester Model F/TM.

[1] Polyvinyl methyl ether available from General Aniline & Film Corporation.
[2] SiO$_2$ available from Cabot Corporation.

180° peel adhesion test results, lb./in.
Example 5 _____ 10.7
Example 6 _____ 9.4

To further explain statements above to the effect that alkyl acrylates and alkyl methacrylates each comprise hard and soft monomers, the following is offered as another way of saying the same things. Alkyl acrylates which provide homopolymers having a low Tg include those in which the alkyl group has from two to twelve carbon atoms. Alkyl methacrylates which provide homopolymers having a low Tg include those in which the alkyl group has from six to fourteen carbon atoms. Alkyl acrylates which when homopolymerized result in a polymer having a high glass transition temperature (Tg) are those in which the alkyl group is methyl or has from thirteen to twenty carbon atoms. Alkyl methacrylates which are "hard" monomers (high Tg) include those in which the alkyl group has from one to five carbon atoms or from fifteen to twenty carbon atoms. As used herein, hard monomers are those which give a homopolymer having a high Tg, that is, one having a Tg of above about 0° C. and soft monomers are those which give a homopolymer having a low Tg, that is, one having a Tg of about 0° C. or below, preferably —15° C. or below.

We claim:

1. A pressure sensitive adhesive composition containing an addition polymer of ethylenically unsaturated monomers, said monomers containing an unsaturated polymerized carboxylic acid present in said polymer in an amount between 0.3% and 4.5% by weight, said polymer having a Tg of 0° C. or less, said composition including a polyvalent metal compound, compatible with the adhesive in an aqueous or organic solvent system, in the form of an ionic metal compound or a metal complex or chelate, at least partially ionizable or soluble in such system, the unsaturated carboxylic acid being present in the polymer in the form of —COOH, —COONH$_4$ or —COOAmine groups, the ratio of polyvalent metal to said groups on an equivalency basis being from about 0.01 to about 2.0, whereby a dried pressure sensitive layer prepared from the composition has enhanced shear resistance, due to crosslinking of —COO— groups by the polyvalent metal, said crosslinking being the sole crosslinking in the adhesive.

2. The composition of claim 1 in which said polymer contains from about 10 to about 99.7 parts by weight of a tackifying monomer and at least about 0.3 part by weight of said polymerizable unsaturated carboxylic acid, any additional monomer being of a type and present in a quantity to provide a Tg of the polymer of —15° C. or less, the total parts by weight of all monomers being 100.

3. The composition of claim 2 in which said ratio of metal to —COOH, —COOAmine or —COONH$_4$ groups is from about 0.05 to about 1.5 and said carboxylic acid is utilized in an amount between about 0.5 and about 3.5%.

4. The composition of claim 3 in which said tackifying monomer is an acrylic acid ester which contains from about 2 to about 12 carbon atoms in the alkyl radical thereof, or said tackifying monomer is a methacrylic acid ester having from about 6 to 14 carbon atoms in the alkyl radical thereof.

5. The composition of claim 4 in which said ester of acrylic acid or methacrylic acid is present in an amount of from 70% to 99.5%, from 0% to 29.5% of an ethylenically unsaturated monomer is included which has a Tg of greater than 0° C., said acid is acrylic acid or methacrylic acid, and in which said polymer is an emulsion polymer.

6. The composition of claim 1 in which the polymer is an emulsion polymer predominantly of esters of acrylic acid, methacrylic acid, or both, in an aqueous medium having an alkaline pH and containing a volatile base.

7. The composition of claim 2 in which the polymer is an emulsion polymer, is predominantly of esters of acrylic acid, methacrylic acid, or both, the polymer is dispersed in an aqueous medium having an alkaline pH, and the composition contains a volatile basic substance.

8. The composition of claim 3 in which the polymer is an emulsion polymer, is predominantly of esters of acrylic acid, methacrylic acid, or both, the polymer is dispersed in an aqueous medium having an alkaline pH, and the composition contains a volatile basic substance.

9. The composition of claim 4 in which the polymer is an emulsion polymer, is predominantly of esters of acrylic acid, methacrylic acid, or both, the polymer is dispersed in an aqueous medium having an alkaline pH, and the composition contains a volatile basic substance.

References Cited

UNITED STATES PATENTS

| | | | |
|---|---|---|---|
| 2,976,203 | 3/1961 | Young et al. | 154—140 |
| 3,558,574 | 1/1971 | Doehnert | 260—78.5 |
| 3,532,708 | 10/1970 | Blance | 260—80.75 X |
| 3,400,103 | 9/1968 | Samour | 117—122 X |
| 3,222,419 | 12/1965 | Jubilee | 260—26 X |
| 3,189,480 | 6/1965 | Franzen et al. | 117—122 |
| 2,754,280 | 7/1956 | Brown | 117—148 X |
| 3,005,802 | 10/1961 | Sellers | 117—122 X |

MELVIN GOLDSTEIN, Primary Examiner

U.S. Cl. X.R.

117—68.5, 76 A, 122 P, PA, PB, PF; 156—60; 260—27 R, 31.8 R, 41 R, A, B, 86.1 R